United States Patent [19]

Sarma et al.

[11] 4,309,259
[45] Jan. 5, 1982

[54] HIGH PRESSURE PLASMA HYDROGENATION OF SILICON TETRACHLORIDE

[75] Inventors: Kalluri R. Sarma; M. John Rice, Jr., both of Tempe, Ariz.

[73] Assignee: Motorola, Inc., Schaumburg, Ill.

[21] Appl. No.: 148,094

[22] Filed: May 9, 1980

[51] Int. Cl.³ .......................................... C01B 33/107
[52] U.S. Cl. .................................... 204/164; 423/342; 423/DIG. 10
[58] Field of Search ............... 423/342, 350, DIG. 10; 204/164

[56] References Cited

U.S. PATENT DOCUMENTS 3,840,750 10/1974 Davis et al. .......................... 204/164
3,933,985 1/1976 Rodgers ........................... 423/342 X
4,102,985 7/1978 Harvey ................................ 423/350

FOREIGN PATENT DOCUMENTS 838378 6/1960 United Kingdom ................ 204/164

Primary Examiner—Jack Cooper
Attorney, Agent, or Firm—John A. Fisher

[57] ABSTRACT

A method is disclosed for the plasma hydrogenation of silicon tetrachloride. A high pressure plasma is utilized to effect a reaction of hydrogen and silicon tetrachloride to form trichlorosilane and other hydrogenated silicon chlorides.

7 Claims, 4 Drawing Figures

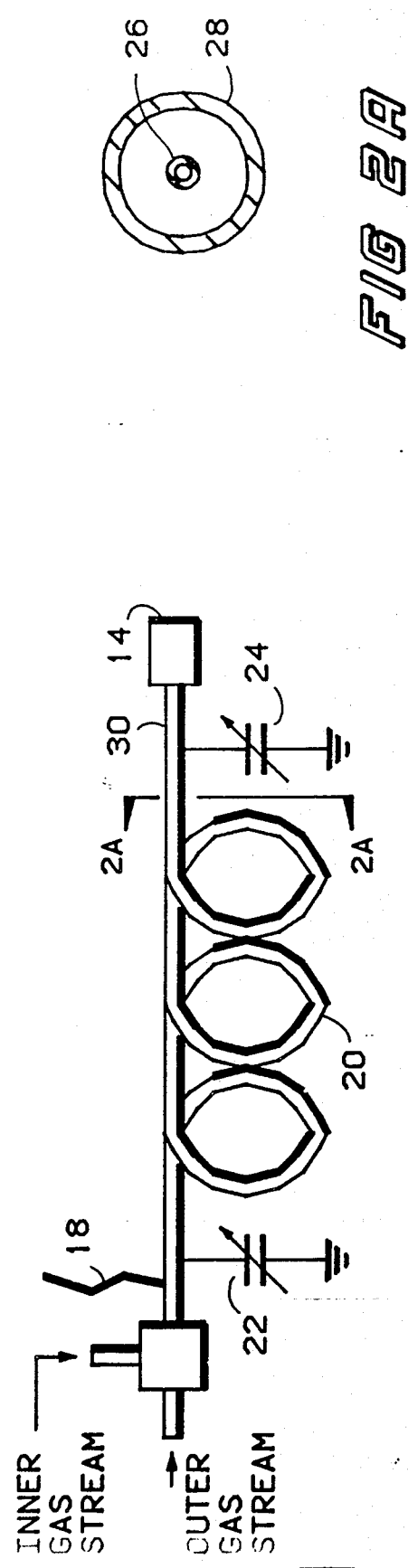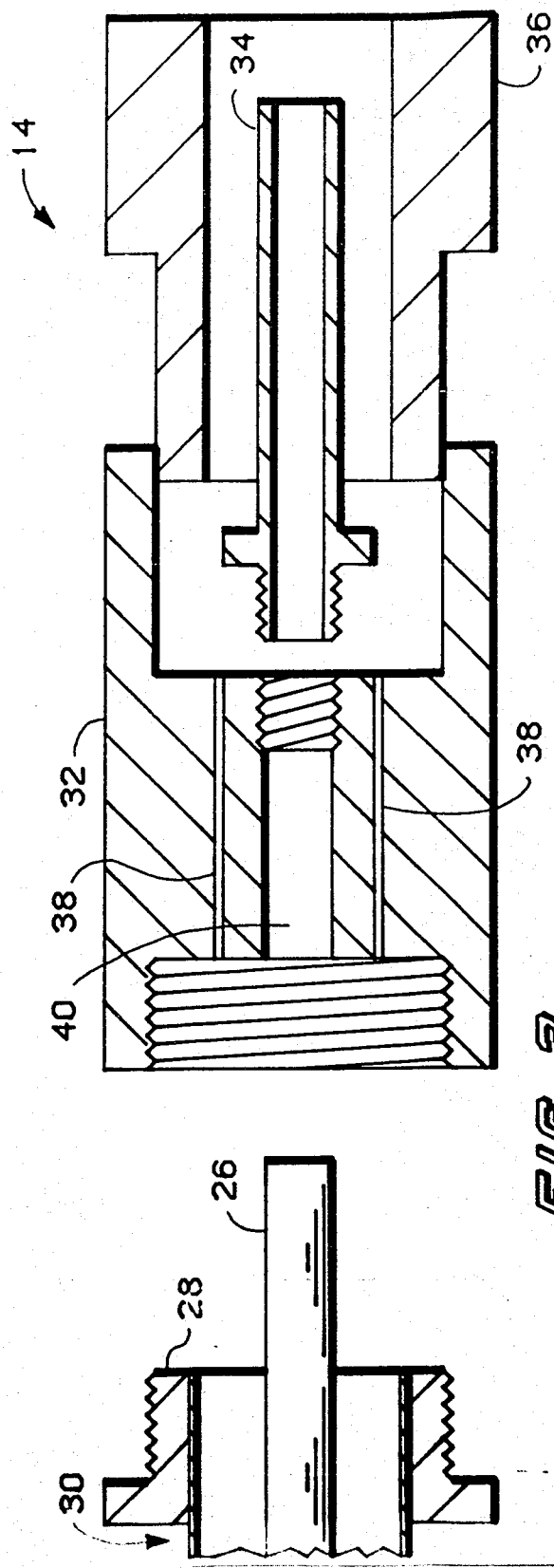

HIGH PRESSURE PLASMA HYDROGENATION OF SILICON TETRACHLORIDE

RELATED APPLICATIONS

This application is related to the inventions disclosed and claimed in concurrently filed, copending, commonly assigned applications entitled High Pressure Plasma Deposition of Silicon applicaton Ser. No. 148,095 and Polycrystalline Silicon Production Ser. No. 148,093.

BACKGROUND OF THE INVENTION

This invention relates in general to a method for the hydrogenation of silicon tetrachloride and more specifically to a high pressure plasma (HPP) method for the hydrogenation of silicon tetrachloride to produce trichlorosilane.

Trichlorosilane is the most widely used silicon source gas for the production of polycrystalline silicon. $SiHCl_3$ is reduced with hydrogen at an elevated temperature to deposit pure polycrystalline silicon. By-products of this reaction are unreacted $SiHCl_3$, $SiCl_4$, HCl, other chlorosilanes and polymeric chlorosilanes. Less than about one third of the input $SiHCl_3$ is converted to silicon and about two thirds is converted to $SiCl_4$. The $SiCl_4$ cannot be used efficiently for polysilicon growth and thus is essentially a low-value waste product. Attempts have been made to convert silicon tetrachloride to trichlorosilane; that is, to convert the waste material $SiCl_4$ to a useful starting material $SiHCl_3$. In one such attempt, $SiCl_4$ is converted to $SiHCl_3$ in a hydrogen reaction at high temperatures (1000°–1200° C.) and at high reactor pressures (typically 30–50 atmospheres). In this conversion, however, conversion efficiency and throughput are too low to be practical. Another problem encountered is that of silicon deposition in the hydrogenation reactor during the conversion.

Accordingly, a need existed for a method of converting silicon tetrachloride to trichlorosilane in order to reduce the cost of starting materials and thereby to reduce the cost of polycrystalline silicon. It is therefore an object of this invention to provide an efficient method for converting silicon tetrachloride to trichlorosilane.

It is a further object of this invention to provide a high pressure plasma method for the hydrogenation of silicon tetrachloride.

It is still another object of the invention to provide a method for the hydrogenation of silicon tetrachloride capable of high throughput and without silicon deposition during the conversion process.

SUMMARY OF THE INVENTION

The foregoing objects are achieved in the invention through the use of the a pressure plasma (HPP) for the hydrogenation of silicon tetrachloride. Hydrogen and silicon tetrachloride are reacted in the presence of a high pressure RF plasma to form $SiHCl_3$, $SiH_2Cl_2$, and HCl by the reaction

$$H_2 + SiCl_4 \xrightarrow{HPP} SiHCl_3 + SiH_2Cl_2 + HCl$$

The process is optimized to enhance the production of $SiHCl_3$. Details of the invention will be further appreciated after a consideration of the following detailed description of the invention taken in connection with the drawings.

BRIEF DESCRIPTION OF THE DRAWINGS

FIG. 2 illustrates a high pressure plasma module for impedance matching and for introduction of reactant gases; and FIG. 3 illustrates in cross-section a high pressure plasma nozzle assembly.

DETAILED DESCRIPTION OF THE INVENTION

Figure 1:
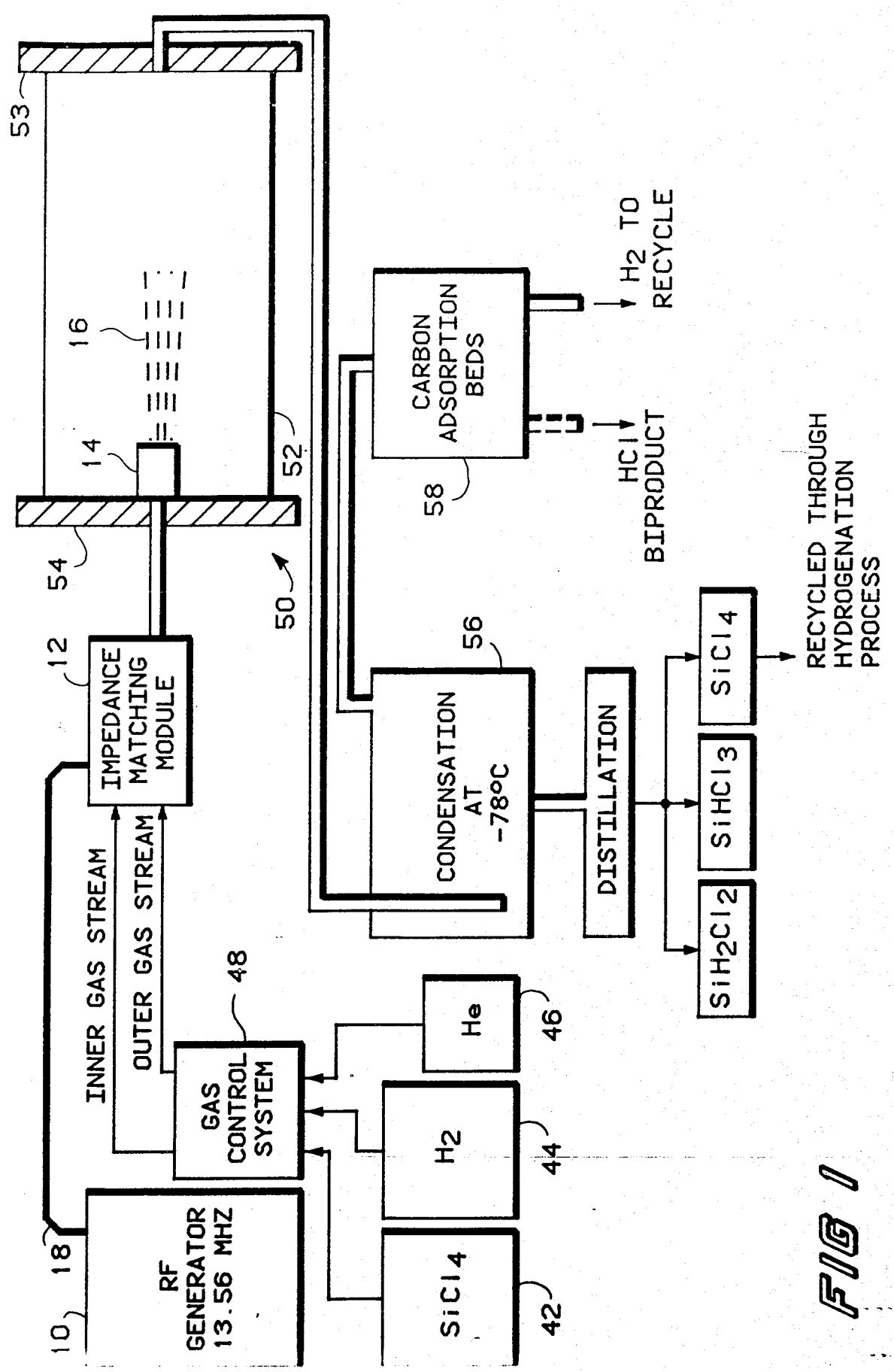
FIG. 1 illustrates an apparatus for practice of the invention.

A plasma can be defined as an approximately neutral cloud of charged particles. The plasma may be formed, for example, by an electric glow discharge in a strong electric field. The types and characteristics of plasmas can vary widely; two types commonly of interest are the low pressure and high pressure plasmas. The boundary line which distinguishes between the two types of plasma is a pressure of about 13.3 KPa (100 torr), but for practical purposes the high pressure plasma (HPP) is typically produced at a pressure of about one atmosphere (101 KPa). An important distinction between low pressure and high pressure plasma relates to temperature: in a low pressure plasma the electron temperature can be much greater than the gas temperature; in contrast, the conditions found in a high pressure plasma lead to thermal equilibrium in which the electron and gas temperatures are nearly identical. The gas temperature in the high pressure plasma can typically reach 3000°–5000° K.

FIG. 1 illustrates an apparatus suitable for practice of the invention. The apparatus comprises an RF generator 10 generating at 13.56 MHz, an impedance matching module 12 and a dual flow nozzle 14 for sustaining a high pressure RF plasma beam 16. The power rating of the RF generator is selected for the particular application. While the exact frequency of the generator is not critical to the invention, this particular frequency is chosen in accordance with FCC regulations. A co-axial cable 18 connects the RF generator to the impedance matching module.

The impedance-matching module is illustrated in FIG. 2. The module is a $\pi$ network and consists of a tubular coil 20 and two variable capacitors 22 and 24 connected between the input and output of the coil, respectively, and ground. Coil 20 is made of two concentric tubes 26, 28 as shown in cross section in FIG. 2a and provides for conveying separate inner and outer gas streams, respectively, through the RF circuit. The output of generator 10 is connected to the input side of the $\pi$ network by coaxial cable 18. The concentric tubes of coil 20 can be made of any material that is a good electrical conductor and that is unreactive with $SiCl_4$. Stainless steel coated with copper on its outer surface, for example, is suitable for the coil material. The copper coating reduces ohmic losses in the coil. When the $\pi$ network is tuned for resonance, the voltage at the output 30 of the network reaches a maximum, a voltage sufficient to create and maintain a high pressure plasma at the tip of the nozzle.

The dual-flow high pressure plasma nozzle is illustrated in more detail in the cross-sectional view of FIG. 3. Output 30 of coil 20 having concentric inner and outer tubes 26, 28, conveying two different gas streams, is attached to nozzle 14. The nozzle is comprised of a metal shell 32 made of stainless steel or other metal that is resistant to the chlorosilane ambient. An inner electrode 34 is formed of a refractory metal such as molybdenum or tungsten. An insulator sheath 36 forms the end of the nozzle. The sheath is formed of an insulator such as boron nitride which has high dielectric strength at the RF frequency and is resistant to the chlorosilane ambient. One of the reactant gases is conveyed through inner tube 26 to inner electrode 34. A second gas is conveyed through outer tube 28 and then through a plurality of ports 38, or openings, which are bored through metal shell 32 and which are arranged concentrically about opening 40 into which inner tube 26 and inner electrode 34 are positioned. The nozzle thus permits the isolation of the two gas streams until they exit at the tip of the nozzle.

FIG. 1 also illustrates a gas control system for controlling input amounts of the silicon tetrachloride and hydrogen reactants. Sources of the silicon tetrachloride, hydrogen, and an inert gas such as helium are shown at 42, 44, 46, respectively. The gases are conveyed to a gas control system 48 which comprises appropriate valves and mass flow controllers for the safe and precise control of the reactant flows. A mole ratio of $H_2$ to $SiCl_4$ of between 4 and 5 is preferred to optimize the $SiCl_4$ to $SiHCl_3$ conversion efficiency. A mole ratio of 4.2, for example, results in a conversion efficiency of about 50%. Mole ratios higher than about 5 can be used to further increase the conversion efficiency, but the higher mole ratios tend to lead to some silicon production in addition to the trichlorosilane production. The gases are conveyed from the gas controller to the impedance matching module where they enter the inner and outer tubes of coil 20.

The high pressure plasma reaction takes place within a reactor 50. The reactor is simply a quartz tube 52, sealed at the ends by end seals 53 and 54. The end seals serve the purpose of sealing the quartz tube and controlling the ambient within the reactor. Dimensions of the quartz tube are not critical; a diameter about four times the length of the plasma beam and a length of about ten times the diameter is satisfactory.

The exact pressure within the reactor depends on the flow rate of reactants, the RF power of the plasma beam (because of gas expansion by heating) and the resistance of the gas flow line exiting the reactor. Control of the pressure at any one specific value is not required. The reactor is not evacuated, however, and thus the pressure within the reactor is consequently above one atmosphere.

Reaction products resulting from the high pressure plasma hydrogenation exit the reactor through end seal 53. The total output of the system comprises unreacted $SiCl_4$ and $H_2$ and the reaction products $SiHCl_3$, $SiH_2Cl_2$, and HCl. This gas mixture is separated by conventional techniques and the unreacted $SiCl_4$ and $H_2$ are recycled through the process. This separation can be accomplished, for example, by passing the output gases first through a condensation apparatus 56 at $-78°$ C. At this temperature all of the $SiCl_4$, $SiHCl_3$, $SiH_2Cl_2$, and some of the HCl will be condensed. The condensate is distilled to separate the individual components. Most of the HCl and all of the $H_2$ pass through the condensation apparatus and into a carbon adsorption bed 58. HCl is adsorbed in the bed while the $H_2$ passes through the bed and is recycled. The HCl is subsequently boiled from the carbon bed and the bed regenerated. The $SiH_2Cl_2$ is valuable elsewhere, e.g. for use in the expitaxial growth of silicon.

The following general example illustrates the practice of the invention. The reactor is purged with helium or other inert gas to remove all air from the system. Hydrogen is introduced into both the inner and outer gas streams of the dual-walled coil at the impedance matching network. The RF generator is turned on and the power is increased to a level which is suitable for creating a plasma. The input and output capacitors of the $\pi$ network are tuned to resonance. The creation of a plasma beam at the dual-flow nozzle and a low reflected power measured at the RF generator are indications of resonance.

After the plasma is created, $SiCl_4$ is gradually introduced into the inner gas stream while gradually reducing the $H_2$ flow in that stream. Changing the gas from hydrogen to silicon tetrachloride affects the tuning of the network; it is therefore necessary to simultaneously retune the impedance matching network to sustain the plasma. When all of the hydrogen in the inner gas stream is replaced by silicon tetrachloride the flow rates of the two gases are adjusted to obtain the desired flow rates and mole ratio of the reactants. Alternatively, the $H_2$ can be introduced through the inner stream and $SiCl_4$ through the outer.

The two reactants exit the high pressure plasma nozzle and react. The extremely high temperatures resulting from the plasma favor the hydrogenation reaction with little or no catenation of molecules. Silicon tetrachloride is thus hydrogenated to form trichlorosilane and dichlorosilane with little formation of potentially detonatable chlorosilane polymers. In comparison, a hydrogenation reaction carried out in low pressure plasmas tends to produce these detonatable chlorosilane polymers in considerable quantities.

An in-line gas chromatograph is used to analyze the output gases from the high pressure plasma reactor so that the conversion efficiency can be instantaneously and continuously determined and monitored. Using the gas chromatograph data, the RF power is adjusted to optimize the conversion efficiency. As the RF power is increased the conversion efficiency is found to increase, reach a maximum, and then decrease. The power level for optimum conversion efficiency depends, however, on the input reactant mole ratio and flow rate. For optimum performance, therefore, the RF power level is adjusted for the particular mole ratio and flow rate and those variables are then precisely maintained.

The following more detailed example further illustrates the practice of the invention. Using a high pressure plasma apparatus as described above, the impedance matching module is adjusted and a plasma initiated. The outer gas stream is adjusted to 2 liters per minute of hydrogen. Silicon tetrachloride is introduced in the inner gas stream by bubbling 4 liters per minute of hydrogen through silicon tetrachloride maintained at room temperature. The mole ratio of hydrogen to silicon tetrachloride is about 4.2. The RF power is adjusted to about 1.7 KW. The hydrogenation is allowed to continue for about 6.5 minutes and the silicon-bearing reaction products are analyzed to be, in volume percent, about 50.1% $SiCl_4$, 41.3% $SiHCl_3$ and about 8.6% $SiH_2Cl_2$. Approximately 50% by volume of the input $SiCl_4$ is converted to either $SiHCl_3$ or $SiH_2Cl_2$. Excellent mass balance of the input $SiCl_4$ and $H_2$, with the products $SiCl_4$, $SiHCl_3$, $SiH_2Cl_2$ and HCl collected from the exhaust of the HPP reactor is observed (after correcting for unreacted $H_2$), indicating that the amount of polymeric material formed is negligible.

There has thus been provided, in accordance with the invention, a method for the hydrogenation without catenation of silicon tetrachloride. This hydrogenation is achieved by the high pressure plasma reaction of hydrogen and silicon tetrachloride. The high pressure plasma results in high conversion efficiency and high throughput because of the high temperature encountered in the plasma. An additional benefit of the high pressure plasma, in contrast to low pressure plasma, is the lessened equipment requirements accruing from working near atmospheric pressure as opposed to a vacuum environment.

While the invention has been described and illustrated with regard to specific examples, it is not intended that the invention be so limited. It will be appreciated, for example, that the dual-flow coil and plasma nozzle can be constructed of materials and have configurations other than those illustrated. Further, the flow rates and powers used are optimized for the particular apparatus configuration used and will, in general, be a function of the specific reactor designs.

Accordingly, it is intended that the invention embrace all such variations and modifications as fall within the scope of the appended claims.

We claim:

1. A method for producing $SiHCl_3$ and $SiH_2Cl_2$ which comprises: creating a high pressure radio frequency hydrogen plasma at a pressure of about one atmosphere (about 101 KPa); and reacting $H_2$ and $SiCl_4$ in said high pressure radio frequency plasma to form $SiHCl_3$ and $SiH_2Cl_2$.

2. The method of claim 1 wherein the mole ratio of $H_2$ to $SiCl_4$ is in the range of 4 to 5 inclusive.

3. A process for the hydrogenation of silicon tetrachloride to form $SiHCl_3$ and $SiH_2Cl_2$ in an apparatus capable of producing a high pressure radio frequency plasma which comprises the steps of: initiating a high pressure radio frequency hydrogen plasma in the apparatus at a pressure of about one atmosphere (about 101 KPa); introducing hydrogen to the plasma through a first means; introducing silicon tetrachloride to the plasma through a second means; and combining the hydrogen and silicon tetrachloride in the presence of said plasma to form $SiHCl_3$ and $SiH_2Cl_2$.

4. A method for producing $SiHCl_3$ and $SiH_2Cl_2$ which comprises:

creating in a volume a high pressure radio frequency hydrogen plasma at a pressure of about one atmosphere (about 101 KPa); introducing reactants comprising hydrogen and silicon tetrachloride to said volume; and creating with said reactants a high pressure radio frequency plasma, said reactants combining in said plasma to form $SiHCl_3$ and $SiH_2Cl_2$ without the production of substantial amounts of chlorosilane polymers.

5. The method of claim 4 wherein said reactants are introduced separately to said volume.

6. The method of claim 4 wherein the output of said step of creating with said reactants a high pressure plasma comprises unreacted hydrogen and silicon tetrachloride and reaction products trichlorosilane, dichlorosilane and hydrogen chloride.

7. The method of claim 6 wherein said output is separated by condensation.

* * * * *